(12) United States Patent
Sonderegger et al.

(10) Patent No.: US 7,872,815 B2
(45) Date of Patent: Jan. 18, 2011

(54) OPTICAL SENSOR

(75) Inventors: Christof Sonderegger, Neftenbach (CH); Kurt Vollenweider, Humlikon (CH); Alex Bertholds, Verscio (CH); Andreas Braunschweiler, Locarno Monti (CH)

(73) Assignee: Kistler Holding AG, Winterthur (CH)

( * ) Notice: Subject to any disclaimer, the term of this patent is extended or adjusted under 35 U.S.C. 154(b) by 568 days.

(21) Appl. No.: 10/586,276

(22) PCT Filed: Jan. 24, 2004

(86) PCT No.: PCT/IB2004/000796

§ 371 (c)(1),
(2), (4) Date: Apr. 18, 2008

(87) PCT Pub. No.: WO2005/080938

PCT Pub. Date: Sep. 1, 2005

(65) Prior Publication Data

US 2008/0239518 A1  Oct. 2, 2008

(51) Int. Cl.
*G02B 7/02* (2006.01)
(52) U.S. Cl. .................... 359/819; 359/800
(58) Field of Classification Search .............. 359/819
See application file for complete search history.

(56) References Cited

U.S. PATENT DOCUMENTS

| 4,753,224 A | 6/1988 | Tojo |
| 5,335,061 A | 8/1994 | Yamamoto et al. |
| 6,320,184 B1 | 11/2001 | Winklhofer et al. |
| 6,713,713 B1 * | 3/2004 | Caldwell et al. ....... 219/121.63 |
| 2002/0027723 A1 | 3/2002 | Lei |
| 2002/0134138 A1 | 9/2002 | Philipp et al. |

OTHER PUBLICATIONS

PCT International Search Report, WO/2005/080938 A1, Sep. 5, 2005.

* cited by examiner

*Primary Examiner*—Jordan M. Schwartz
*Assistant Examiner*—James C Jones
(74) *Attorney, Agent, or Firm*—Dority & Manning, P.A.

(57) ABSTRACT

An optical sensor for the monitoring of combustion processes in a combustion chamber comprises a lens system facing the combustion chamber, a waveguide and a sheath surrounding the lens system. The lens system has at least one essentially plano-concave lens and a double concave lens wherein the planar surface of the plano-concave lens is exposed to the combustion chamber. A method for centering one or more lenses and a waveguide in a sheath of an optical sensor for monitoring combustion processes in a combustion chamber is also disclosed that includes filling the gap between the first lens and the sheath with a soldering paste.

19 Claims, 1 Drawing Sheet

OPTICAL SENSOR

CROSS-REFERENCE TO RELATED APPLICATIONS

This application claims priority to application serial no. PCT/IB2004/000796, filed on Jan. 24, 2004.

BACKGROUND OF THE INVENTION

The present invention relates to an optical sensor for the monitoring of combustion processes in a combustion chamber and to a method for the manufacture of said sensor.

In internal combustion engines, for example spark ignition engines or diesel engines, optical sensors are used to monitor combustion. Recording the brightness over time in a combustion chamber on the one hand provides valuable data useful as boundary conditions for computational models since the temperature can be inferred from the brightness. On the other hand, the soot concentration within the combustion chamber can be deduced by determining the brightness. Due to increasingly harsh regulations with respect to gas emissions legislation a lot of effort is undertaken to decrease the soot formation during combustion in engines. Optical sensors provide valuable data for these developments.

Thus, as described in EP 0593413 for example a plurality of optical sensors are arranged in the cylinder head gasket of an internal combustion engine. For this purpose, the diameter of such sensors must not be larger than about 2 mm. The angular coverage of sensors in this application is 10 to 40°.

A plurality of sensors in the combustion chamber is provided for this field of application to be able to cover the spatial extension of combustion. In this case a correspondingly smaller angular coverage is provided.

Other fields of application provide a single sensor which is intended to collect as much as possible of the light emitted in the combustion chamber. A large angular coverage is required from such a sensor. Sensors used for this purpose have an angular coverage of about 110°. The diameter of such sensors is more than 10 mm. Therefore, such sensors cannot be built into a spark plug or heater plug.

These sensors are for example mounted directly into the cylinder head in openings provided for this purpose. Difficulties arise during mounting and sealing the resulting openings.

Another possibility is to mount an optical sensor into a spark plug of a spark ignition engine or into a heater plug of a diesel engine. This is for example achieved by means of a thread provided on the sensor. This provides the advantage of rapid assembly and disassembly and does not require additional mechanical work on the engine.

In general, optical sensors are made of a lens which lets pass the light impinging onto one surface and emits it from the opposite surface. Subsequently, the light impinges on a waveguide which conducts the light to a monitoring device. At this monitoring device, the light signal is processed into data and edited in a form which enables further evaluation of the information.

The lens as well as one end of the waveguide are usually surrounded and kept together by a sheath. The difficulties in centering are mainly encountered in the case of very small diameters and depths of the lenses.

BRIEF SUMMARY OF THE DISCLOSURE

It is therefore an object of the present invention to suggest an optical sensor having an angular coverage of at least 130° and having a cross section of not more than 10 mm, preferably less than 6.5 mm, in particular 2.5 to 3.5 mm.

It is therefore an object of the present invention to suggest a method by which the lens of an optical sensor can be centered with the highest precision.

This object has been achieved by the preambles of the independent claims.

The present disclosure relates to an optical sensor for the monitoring of combustion processes in a combustion chamber wherein the optical sensor at least comprises a lens system facing the combustion chamber, a waveguide and a sheath surrounding the lens system and one end of the waveguide characterized in that the lens system consists of at least one essentially plano-concave lens and a double concave lens wherein the planar surface of the plano-concave lens is exposed to the combustion chamber. The disclosure also relates to a method for the manufacture of said sensor.

BRIEF DESCRIPTION OF THE DRAWING

The present invention will be explained with respect to the following drawing. The FIGURE shows.

DETAILED DESCRIPTION OF EMBODIMENTS

Figure 1:
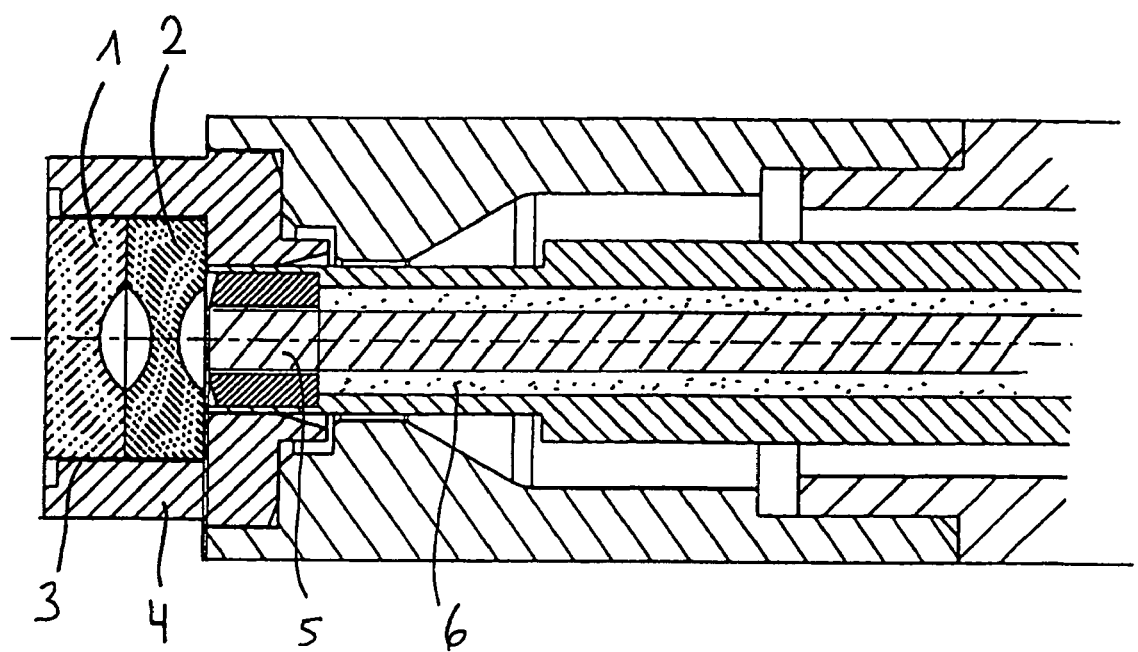
FIG. 1 an embodiment according to the invention of an optical sensor

FIG. 1 shows the tip of an optical sensor. In this embodiment a lens system consisting of two lenses 1, 2 is shown. On of the lenses 1 is a plano-concave lens wherein the planar surface faces the combustion chamber. The second lens 2 is a double concave lens and arranged directly behind the first lens 1. Both lenses are arranged within a sheath 4. A waveguide 5 also extends into the sheath 4 with one end. The waveguide 5 also is positioned with high precision. By the waveguide 5 the collected light is guided and finally arrives at a suitable monitoring device which processes the light to generate a signal and evaluates it for other purposes. A sensor of this type can be assembled in a spark plug or a heater plug, for example by means of a thread provided on the sensor.

The lens system 1, 2 provides a beam path having an angular coverage of 110° to 140°. Lens systems of 130 to 135° have been found to serve this purpose very well.

The lenses 1, 2 used are made of a material having a coefficient of thermal expansion at 0 to 400° C. of less than $10.5 \cdot 10^{-6}$ $K^{-1}$, particularly between $0.15 \cdot 10^{-6}$ $K^{-1}$ and $6.7 \cdot 10^{-6}$ $K^{-1}$. The surface area of least lens 1 must be solderable or solderably equipped, for example with a metal plating. Both lenses 1, 2 are intended to transmit light waves up to 10 μm, at least in a range of 0.2 to 2 μm. For example, sapphire and quartz glass have been found suitable. The waveguide 5 ends directly in a predetermined distance of the lens 2 and is embraced in the area of the sheath 4. In the rear portion of the sensor the waveguide 5 is sealed into the sensor by pouring an appropriate mass 6.

Interesting with respect to this lens system 1, 2 is the possibility to produce small lenses 1, 2 and thus small sensors. Such sensors are intended for the assembly in a spark plug or heater plug. Therefore, it is desirable to fabricate lens systems 1, 2 having a diameter of <8 mm, preferably <5 mm, particularly <2.4 mm. In this way the outer diameter of the sheath 4 becomes <10 mm, preferably <6.5 mm, particularly 2.5 to 3.5 mm.

The length of the lens system 1, 2 which has to be passed by the light is generally at most equal to the diameter of the lens system 1, 2, preferably 50 to 75% of the diameter of the lens system 1, 2.

The lenses 1, 2 must be assembled and fixed in a centered manner and with high precision in the recess of the sheath 4. The waveguide must be assembled in a precisely predetermined distance from the lens. The precision is the more required the smaller is the diameter of the lenses 1, 2. Already a small deviation from the central position deteriorates the signal or even makes it unusable. The method of the invention explained herein enables this required precise centering.

With respect to the recess of the sheath 4 into which they have been introduced, the lenses 1, 2 have a slackness of 5 to 10 µm. The sheath is made of a material having a coefficient of thermal expansion in the range of 0 to 400° C. of less than $10.5 \cdot 10^{-6}$ $K^{-1}$, particularly less than $7 \cdot 10^{-6}$ $K^{-1}$. In addition, the material of the sheath 4 must be solderable and able to withstand continuous temperatures up to 600° C. and momentary temperatures up to 950° C. The sheath 4 must have a spalling resistance of about 50 K/10 ms. The thermal conductivity of the material of the sheath 4 should be at least 20 W/mK, preferably at least 50 W/mK. The material of the sheath 4 must be mechanically processable with a precision of ±10 µm, preferably ±5 µm.

The method for centering the lenses 1, 2 in the recess of the sheath 4 is to fill the gap 3 between the first lens 1 and the sheath 4, and optionally also the gap between the lens 2 and the sheath 4 generated by the slackness 3 with a soldering paste. The soldering paste should have an upper melting point of 770 to 1100° C. and good wettability.

The axial orientation of the waveguide 5 and the lens system 1, 2 must also be very precise with a small deviation of less than 10 µm, preferably less than 5 µm. This is achieved by deep-drawing the sheath.

The invention claimed is:

1. An optical sensor for monitoring combustion processes in a combustion chamber, comprising:
   a lens system facing the combustion chamber,
   a waveguide and
   a sheath surrounding the lens system and one end of the waveguide, wherein the lens system comprises at least one essentially plano-concave lens and a double concave lens wherein the planar face of the plano-concave lens is exposed to the combustion chamber.

2. A sensor according to claim 1 wherein the angular coverage of the lens system is at least in a range of 130° up to 140°.

3. A sensor according to claim 1 wherein the lenses are composed of sapphire or quartz glass.

4. A sensor according to claim 1 wherein at least the plano-concave lens at its surface area is surrounded by a metal plating.

5. A sensor according to claim 4 wherein the plano-concave lens is fixed to the sheath by means of a soldering material.

6. A sensor according to claim 1 wherein the lens system has a maximum diameter of <8 mm.

7. A sensor according to claim 1 wherein the length of the lens system which has to be passed by the light is at most equal to the diameter of the lens system.

8. A sensor according to claim 1 wherein the outer diameter of the sheath is at most 10 mm.

9. A sensor according to claim 1 wherein the sensor can be assembled in a spark plug or in a heater plug.

10. A sensor according to claim 1 wherein the slackness between the outer radius of the lenses and the inner radius of the sheath is less than 10 µm.

11. A sensor according to claim 3 wherein at least the lens facing the combustion chamber is fixed by means of a soldering material to the sheath.

12. A sensor according to claim 1 wherein the sheath is made of a material able to withstand a continuous temperature load of 600° C. and a momentary temperature load of 950° C.

13. A sensor according to claim 1 wherein the sheath is made of a material having a coefficient of thermal expansion in the range of 0 to 400° C. of less than $10.5 \cdot 10^{-6}$ $K^{-1}$.

14. A method for the centering of one or more lenses and a waveguide in a sheath of an optical sensor for the monitoring of combustion processes in a combustion chamber, said sensor comprising a lens system having at least two lenses, wherein the gap between the outer radius of the lenses and the inner radius of the sheath is less than 10 µm, and that the gap is filled with a soldering paste and that the deviation of the axial orientation of the waveguide and the lens system is less than 10 µm.

15. The method according to claim 14 wherein a deep-drawn sheath is used.

16. The method according to claim 14, wherein the sensor consists of at least a lens system facing the combustion chamber, a waveguide and a sheath surrounding the lens system and one end of the waveguide wherein the lens system comprises at least one essentially plano-concave lens and a double concave lens and wherein the planar face of the plano-concave lens is exposed to the combustion chamber.

17. The method according to claim 16, wherein the plano-concave lens is fixed to the sheath by means of a soldering material.

18. The method according to claim 16, wherein the sensor can be assembled in a spark plug or in a heater plug.

19. The method according to claim 14, wherein at least the lens facing the combustion chamber is fixed by means of a soldering material to the sheath in the area of the gap.

* * * * *